United States Patent
Misterek et al.

(10) Patent No.: US 11,853,482 B2
(45) Date of Patent: Dec. 26, 2023

(54) INTERACTIVE DISPLAY

(71) Applicant: BBY Solutions, Inc., Richfield, MN (US)

(72) Inventors: Travis Misterek, Bloomington, MN (US); Darin Michels, Hopkins, MN (US); Scott Phillips, Falcon Heights, MN (US)

(73) Assignee: BBY Solutions, Inc., Richfield, MN (US)

( * ) Notice: Subject to any disclaimer, the term of this patent is extended or adjusted under 35 U.S.C. 154(b) by 25 days.

(21) Appl. No.: 17/497,615

(22) Filed: Oct. 8, 2021

(65) Prior Publication Data

US 2023/0115679 A1    Apr. 13, 2023

(51) Int. Cl.
| | | |
|---|---|---|
| *G06F 1/16* | (2006.01) | |
| *G06F 3/0338* | (2013.01) | |
| *H04N 21/422* | (2011.01) | |
| *H04N 21/433* | (2011.01) | |
| *H04N 21/436* | (2011.01) | |

(52) U.S. Cl.
CPC .......... *G06F 3/0338* (2013.01); *G06F 1/1605* (2013.01); *H04N 21/42206* (2013.01); *H04N 21/433* (2013.01); *H04N 21/436* (2013.01)

(58) Field of Classification Search
CPC ............... G06F 1/1605; G06F 3/0338; H04N 21/42206; H04N 21/433; H04N 21/436
See application file for complete search history.

(56) References Cited

U.S. PATENT DOCUMENTS

| | | | | |
|---|---|---|---|---|
| 6,201,947 B1 * | 3/2001 | Hur | ........................ | G09B 5/062 |
| | | | | 369/69 |
| 6,729,543 B1 * | 5/2004 | Arons | .................... | G09B 5/062 |
| | | | | 235/462.01 |
| 7,511,585 B2 * | 3/2009 | Lin | ........................ | G09B 5/062 |
| | | | | 324/656 |
| 8,594,557 B2 | 11/2013 | Taylor | | |
| 2011/0236869 A1 * | 9/2011 | Taylor | ...................... | G09B 5/02 |
| | | | | 434/317 |

* cited by examiner

*Primary Examiner* — Ryan A Lubit
(74) *Attorney, Agent, or Firm* — Forsgren Fisher McCalmont DeMarea Tysver LLP; James M. Urzedowski; Daniel A. Tysver

(57) ABSTRACT

Systems and methods of use are presented for selecting and displaying media content on a display where the media content is determined by user manual manipulation of the content pages of a book positioned on a book reader. The display includes a video display screen and a media player. The media player has a storage drive configured to accept and store media content, and a processor configured to access the storage drive to transmit selected media content to the video display screen when signaled by the book reader to do so. The book reader includes a plurality of sensors divided into a plurality of right side sensors and a plurality of left side sensors that are configured to detect and determine which content page of the book is currently open and displayed on the book reader. When a content page is displayed and detected, a controller signals the processor.

9 Claims, 11 Drawing Sheets

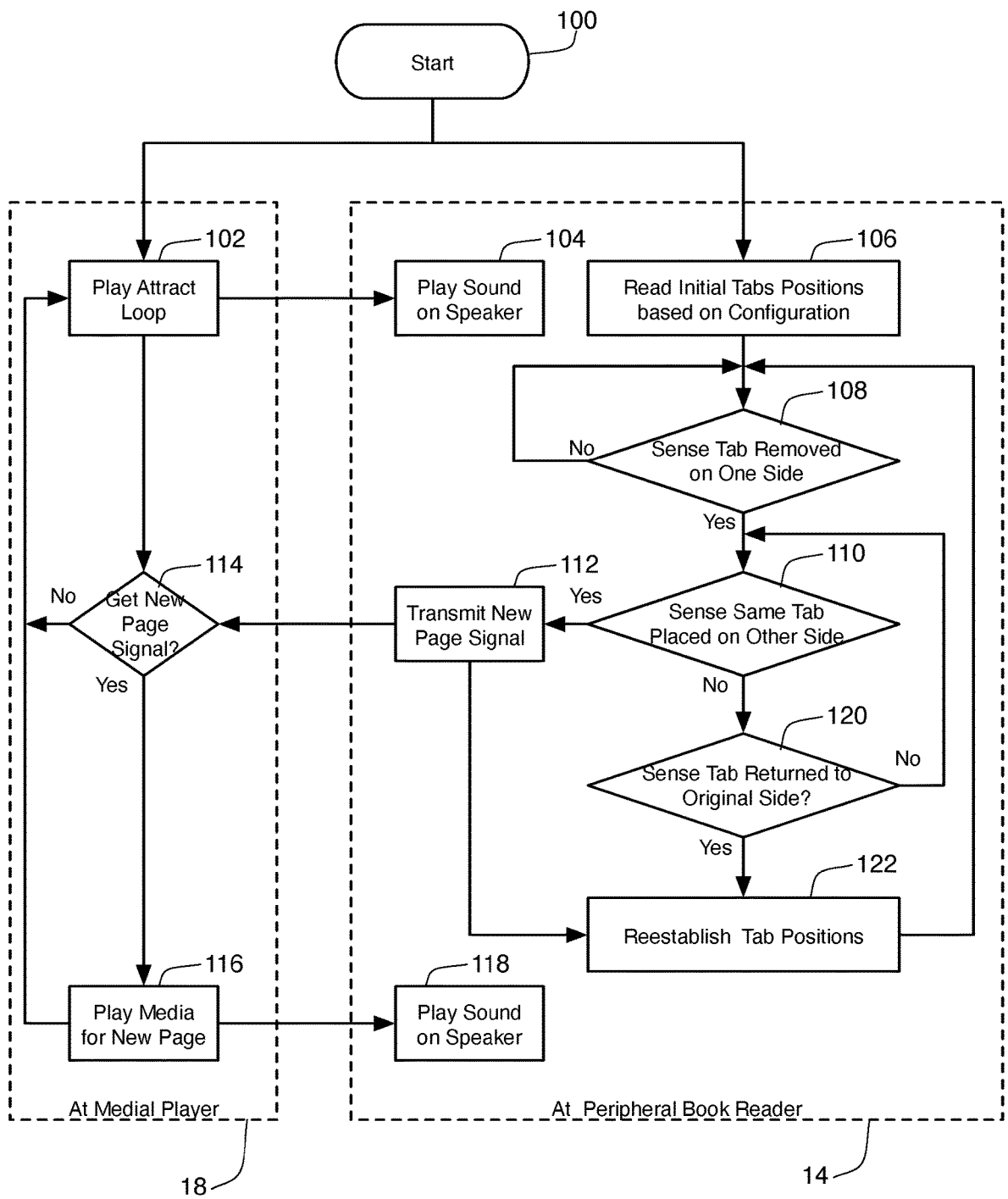

INTERACTIVE DISPLAY

FIELD OF THE INVENTION

The present application relates to interactive displays that include a user interface peripheral device. The peripheral device includes a plurality of sensors on two sides of a book to sense physical interaction therewith by the user to select and display media content that is presented on a video display and/or heard through a speaker.

SUMMARY OF THE INVENTION

Embodiments disclosed herein are directed to interactive audio/video display systems such as video kiosks that may be used in a commercial establishment to advertise to consumers (users) various products. Unlike existing display systems that might use a keyboard, mouse, track ball, or similar peripherals to provide the user with the ability to interact with the display, or provide the display with a touch screen function for more direct interaction, embodiments of the present invention provide a peripheral "book reader" that can be provided with various books with which a user may interact with by turning the pages of the book in order to control the video and audio content to be displayed.

Each book is comprised of first and last cover pages, with content pages therebetween. At least the back cover page is be provided with exterior surfaces configured to be temporarily secured to a reading surface of the book reader. Each content page of the book has written and/or illustrated content that corresponds to audio/visual (a/v) media content to be displayed on the screen of the display and/or played though a speaker. Each content page of the book is provided with a tab. The position of each tab is detectable by the book reader when a page is in a closed position, an opened position and positioned between the opened and closed positions.

When a book is properly positioned on the reading surface of the book reader, and the user turns a content page to the opened position, the system detects the position of the tab on the book reader to determine which page is open to the user, and causes the media player to play the media content associated with the opened page; the audio aspect of the played media content will be played through the systems speaker(s) and any visual aspect of the played media content will be displayed on the screen of the display. When subsequent pages are placed in the opened position, the book reader will detect the position of the tab for each such opened page and play the appropriate media content for each page successively. When a page is returned back to the closed position the system will play the media content for the page that is now open to the user. If all pages are returned to the closed position the system will return to a standby or attract mode.

The book reader is configured with sensors located on two sides of the book to detect the lifting of a tab from one side of the book and the placement of the tab on the other side of the book. This combination of sensors helps prevent accidental triggering of a new page based on inadvertent or intentional interaction with the sensors on one side of the book.

The system as described may utilize any number of books with customized content that corresponds to a/v media content that is uploaded to the media player. This provides a retailer with a display system for advertising any number of products, and which is easily accessible to any consumer capable of turning the pages of a book. In addition, embodiments of the present system may be set up such that the more costly and delicate display is out of reach to the consumer/user, with only the book, secured to the book reader accessible. This can reduce long term costs as well as wear and tear on the system.

These and other embodiments are described in greater detail below and are depicted in the figures included herewith.

BRIEF DESCRIPTION OF THE DRAWINGS

FIG. 11 is a flow chart showing a process of using the systems shown in FIGS. 1-10.

DETAILED DESCRIPTION

As mentioned above, embodiments of the system described herein are directed to user interactive systems for displaying a/v media content on a display's screen and/or though speakers, wherein the media content to be played is selected by a user's physical manipulation of a book. An example of such a system 10 is depicted in FIG. 1.

Figure 1:
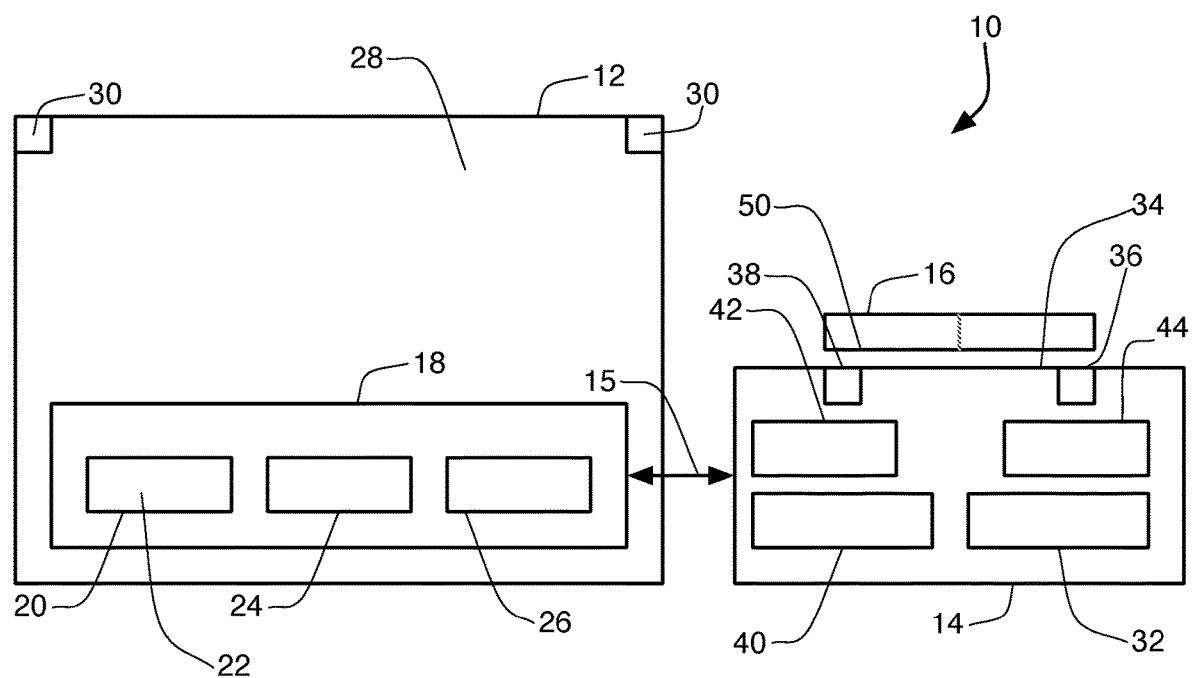
FIG. 1 is a schematic view of an embodiment of the interactive display system including a display, peripheral book reader, and book.

As shown in FIG. 1, the system 10, includes a display 12, a peripheral book reader 14, and a book 16. The display 12 is in electronic communication with and is controlled by the peripheral book reader 14. This communication is illustrated by arrow 15. The electronic communication between the display and reader may be provided by any sort of direct electronic connection interface (e.g., USB connections and cord) or wireless connection (e.g., Bluetooth® connection), as such the display 12 and the book reader 14 may be spaced some distance apart from one another or positioned in relatively close proximity.

In the embodiment shown, the display 12 includes a media player 18 which has a media content storage drive 20 that is provided with programed media content 22. The media content 22 is provided to the media player 18 and stored on the drive 20, and may be any sort of a/v program, such as for example, a series of video presentations that describe the details and/or benefits of various products.

The media player 18 is preferably built into the display 12, but may also be a stand-alone device that is connected to the display 12 and book reader 14.

The drive 20 is accessible via Wi-Fi, internet connection (ethernet, etc.), or by a dedicated USB or other type of interface, to allow for media content 22 to be updated or changed as desired. In addition to media content 22 that corresponds to the printed content of the book 16, media content 22 will also include a standby or attract loop video program that will be automatically shown on the display screen 28 when the system 10 is not being used. In some embodiments, the attract loop program includes an audio component that is played through the built-in speaker of the peripheral book reader 14. In other embodiments, the attract loop program will have no audio component so as to minimize background noise.

Media player 18 includes a processor 24 and programming code 26 that activates the player 18 to play selected media content 22 when the appropriate activation signal is received by the media player processor 24 from the peripheral book reader 14. When such a signal is received from the book reader 14, the processor 24 accesses the drive 20 to select the correct media content 22, whereupon the media player 18 displays the video component of the content on the display screen 28 and plays the audio component through the speakers 30 of the display 12.

As indicated above, in some embodiments, the book reader 14 is provided with a built-in speaker 32. When media content 22 is played by the media player 18 the system is configurable to play the audio component through the display's speakers 30, the book reader's speaker 32, or both.

Turning now to the peripheral book reader 14, the book reader 14 includes a book reading area or surface 34 which is sized to receive a book 16 thereon. The book reader 14 includes right side sensors 36 and left side sensors 38 that can detect when a page of the book 16 is positioned in an open position or a closed position on the book reading surface 34.

Figure 2:
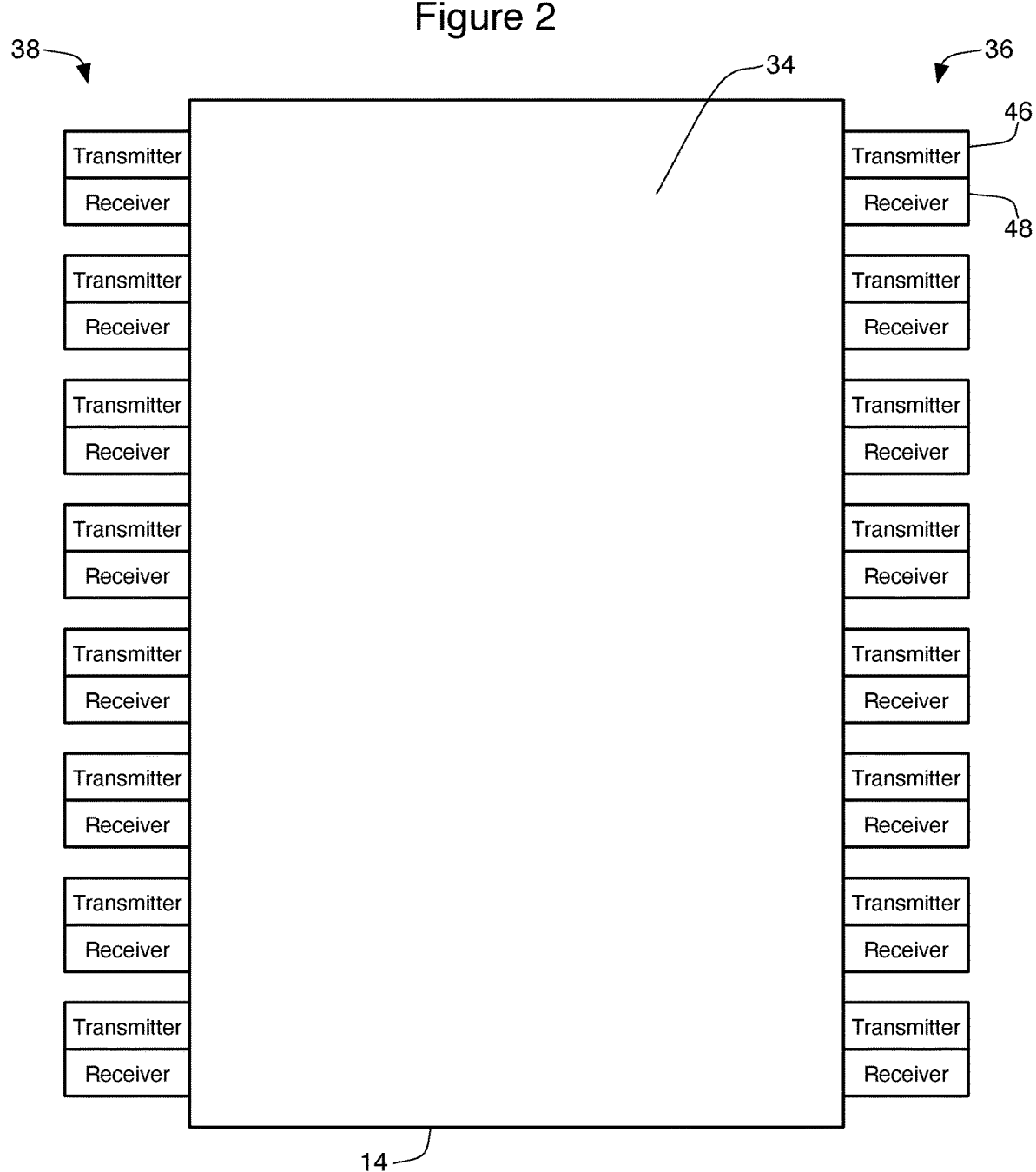
FIG. 2 is a schematic view of an embodiment of the peripheral book reader used by the system in FIG. 1.
Figure 3:
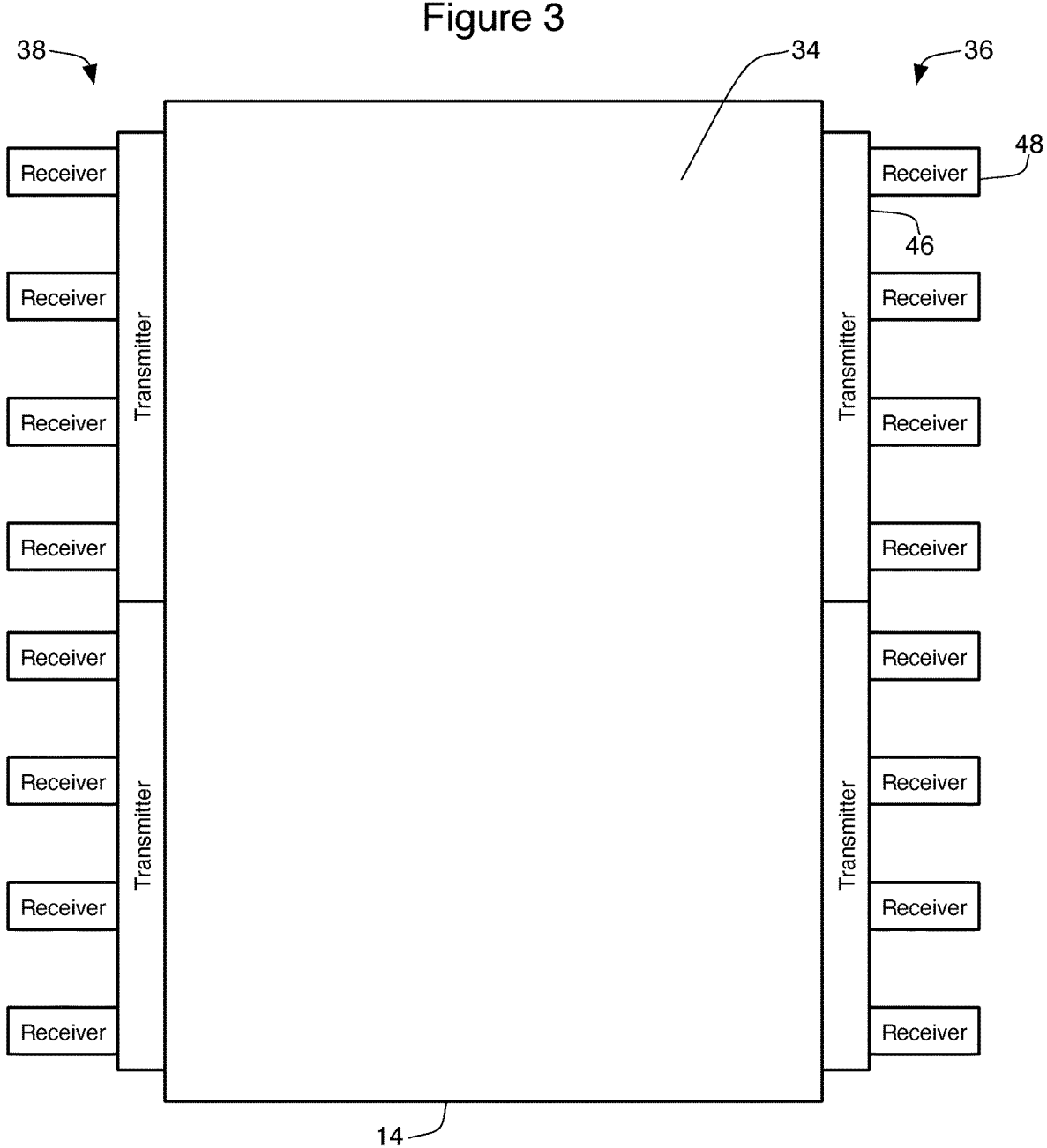
FIG. 3 is a schematic view of an alternative embodiment of the peripheral book reader used by the system in FIG. 1.

As shown in FIG. 2, there are an equal number of right side sensors 36 and left side sensors 38. The position and arrangement of each of the right side sensors 36 correspond to the position and arrangement to each of the left side sensors 38. In the embodiment shown in FIG. 2, there are eight sensors on each side, for a total of sixteen sensors. In other embodiments, the number of sensors on each side of the reading surface 34 may vary but they will typically be between two and fifteen.

The book reader 14 also includes a controller or switch 40 that is controlled by a book reader processor 42 and controlling code 44. The book reader processor 42 is in electronic communication with the sensors 36 and 38, as well as the controller 40, such that when the sensors detect that a page of the book 16 has been moved from a closed position to an open position the processor 42 signals the controller 40 that a specified page of the book 16 is being displayed in the book reading surface 34. The controller 40 then sends a signal to the media player processor 24 to select and play the media content 22 associated with the page of the book 16 being displayed on the book reading surface. The manner in which the sensors 36 and 38 of the book reader 14, and the pages of the book 16 interact are shown in FIGS. 2-10 and described in greater detail below. The controller 40 may take the form of a USB interface, or some other interface circuitry designed to transmit and receive communications 15 with the media player 18.

The functional nature of the sensors 36 and 38 may vary, in that a sensor may detect the presence of a book page by optical, electrical, magnetic, or mechanical contact. In the embodiments shown and described herein the sensors 36 and 38 are optical sensors, and specifically infrared (IR) sensors. Each sensor includes transmitter 46 and receiver 48 components.

Optical sensors 36 and 38 are conventional IR sensors that operate by the sensor transmitting an IR light signal from the transmitter 46 and detecting at the receiver 48 the light signal that is reflected back off of a surface that is in range of the initially transmitted light signal. In the present system 10, the surface in question will be a tab 58 that each content page 56 of a book 16 is provided with in the manner shown in FIGS. 4-10 and whose function and characteristics are discussed in greater detail below.

The light reflected off of the tabs is detected by the receiver 48 and is interpreted by the book reader processor 42 to identify the media content 22 associated with a specific content page of the book 16. In the embodiment shown in FIG. 2, each sensor 36 and 38 is provided with an individual transmitter 46 and an individual receiver 48. In other embodiments however, it may be beneficial in terms of cost and efficiency to provide a reduced number of transmitters 46 for some or all of the receivers 48. For example, in the embodiment shown in FIG. 3, the right side sensors 36 and left side sensors 38 are respectively provided with only one transmitter 46 per four receivers. In some embodiments, a single light transmitter 46 may provide the IR light signal for all of the sensors on a given side of the book reading surface 34.

Figure 9:
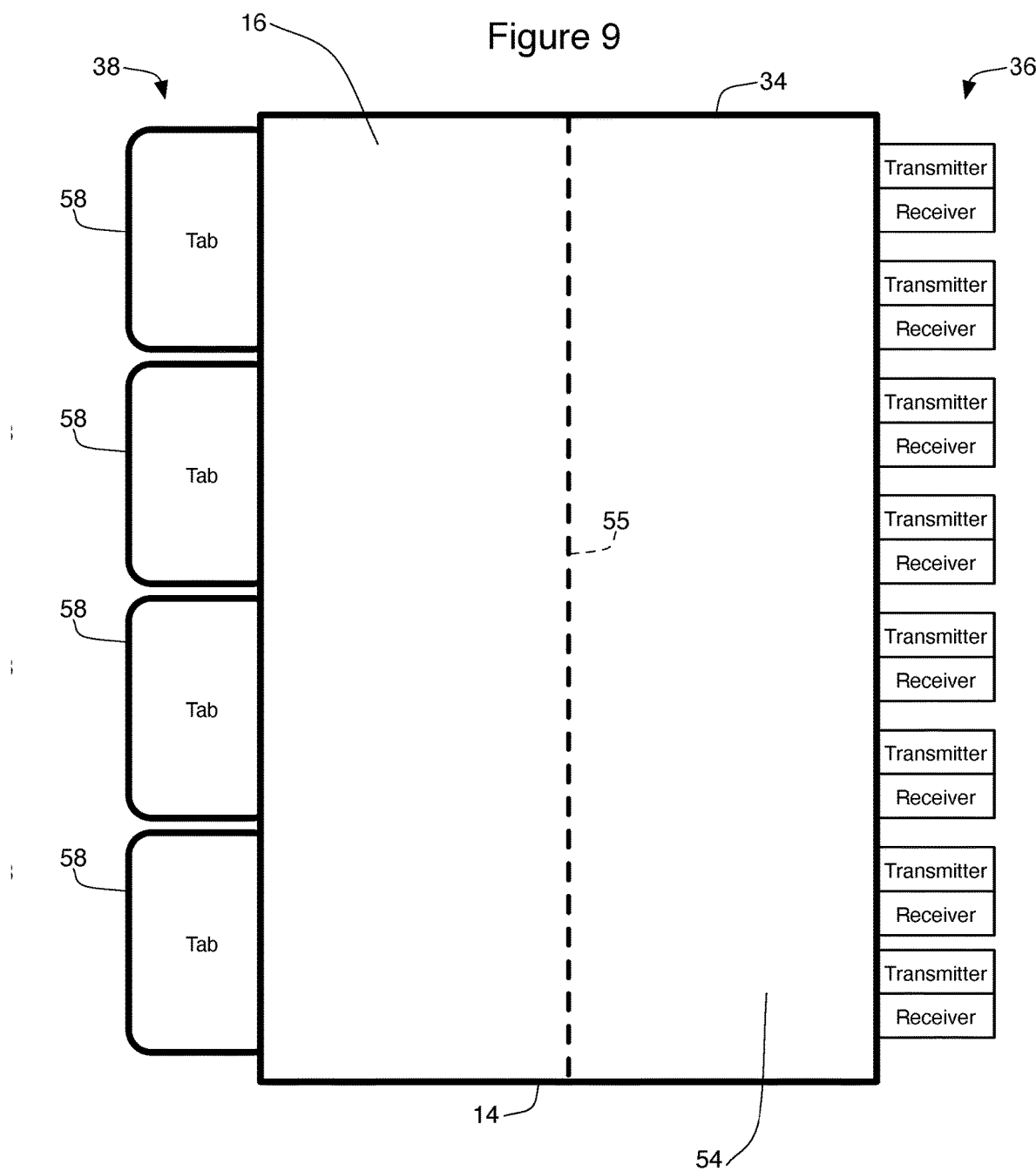
FIG. 9 is a schematic view of the peripheral book reader shown in FIG. 8, with all four content pages of the book shown in the opened position and the back cover page shown secured to the reading surface of the book reader.
Figure 10:
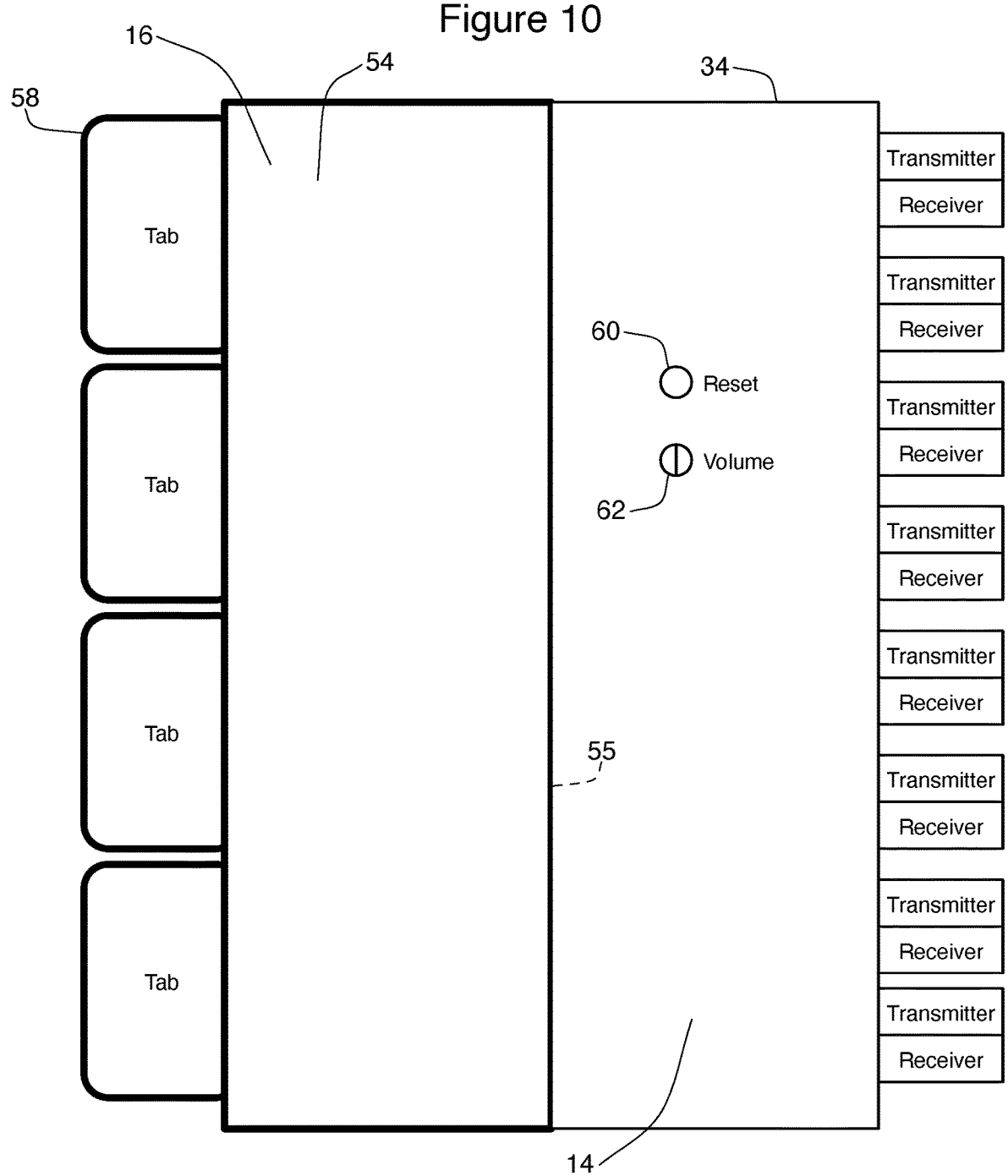
FIG. 10 is a schematic view of the peripheral book reader shown in FIG. 9, wherein the rear cover page is shown unsecured from the reading surface and in the closed position exposing manual controls of the book reader for access.

The book 16 has a front cover 52 and a back cover 54 (visible in FIGS. 9 and 10). When a book 16 is placed over the book reading surface 34, such as in the manner shown in FIG. 4, the exterior surface 50 (shown in FIG. 1) of at least the back cover 54 is temporarily adhered or affixed to the book reading surface 34 via a magnetic adherence, mechanical engagement, temporary adhesive, or other engagement mechanism that ensures the position of the book 16 upon the book reading surface 34 is not inadvertently shifted or moved once the book 16 is positioned on the reading surface 34, but which allows the book 16 to be removed from the reading surface with deliberate effort without damaging either the book 16 or the book reader 14.

In some embodiments, the front cover 52, is temporarily adhered to the book reading surface in the same manner as the back cover 54. In alternative embodiments the front cover 52 is not secured, and is freely moveable between the closed position and the open position in the same manner as a content page 56. In some embodiments, the front cover 52 functions in the same manner as a content page 56, having unique printed media content that is associated with selected media content 22 stored on the storage drive 20 of the media player 12, and activated by the presence and detection of a tab 58 by left side sensors 38, such as in the manner described below.

Figure 4:
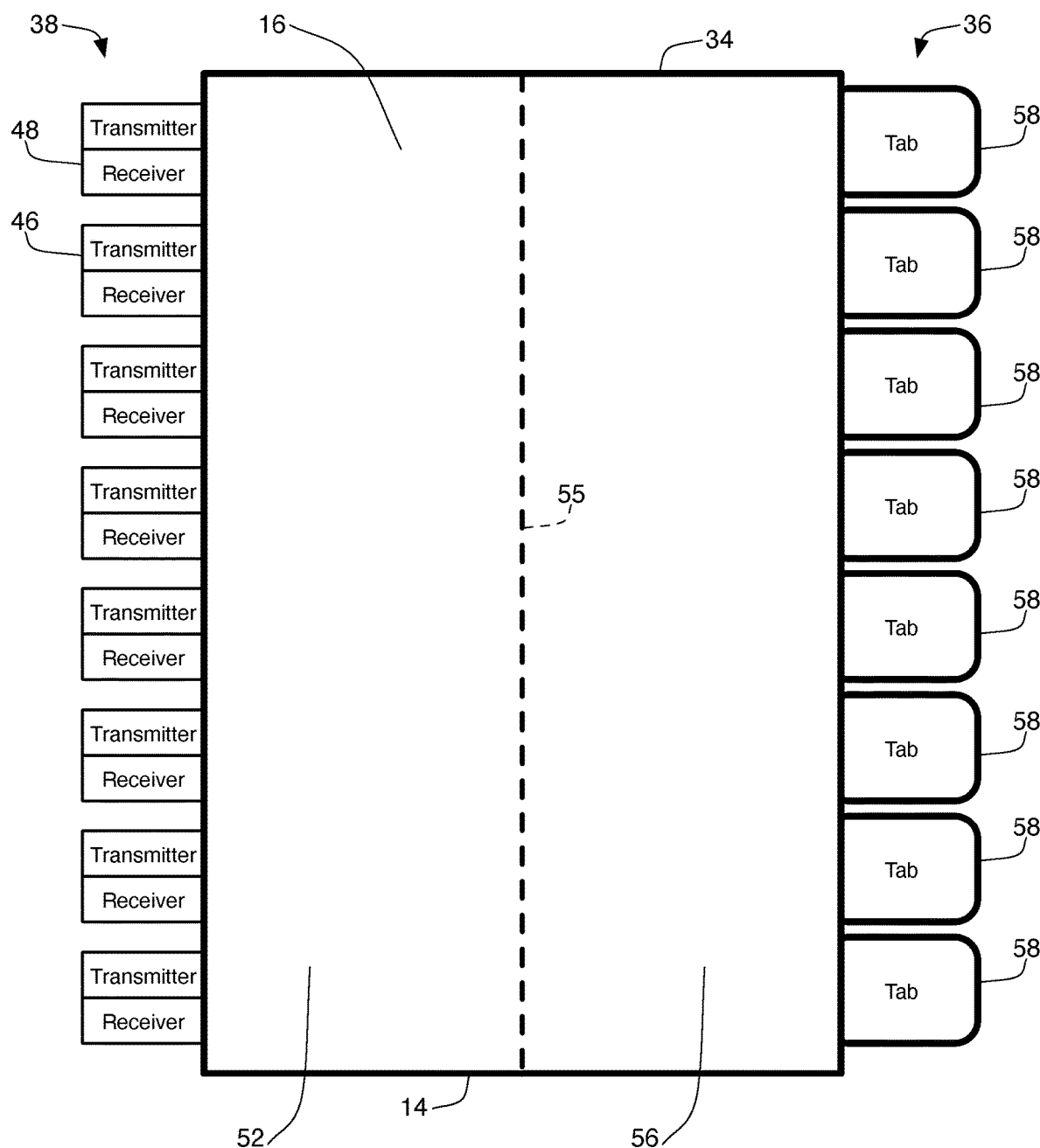
FIG. 4 is a schematic view of the peripheral book reader shown in FIG. 2, with a book having eight content pages positioned over the reading surface of the book reader and shown with all content pages in the closed position, and the front cover page shown secured to the reading surface of the book reader.
Figure 5:
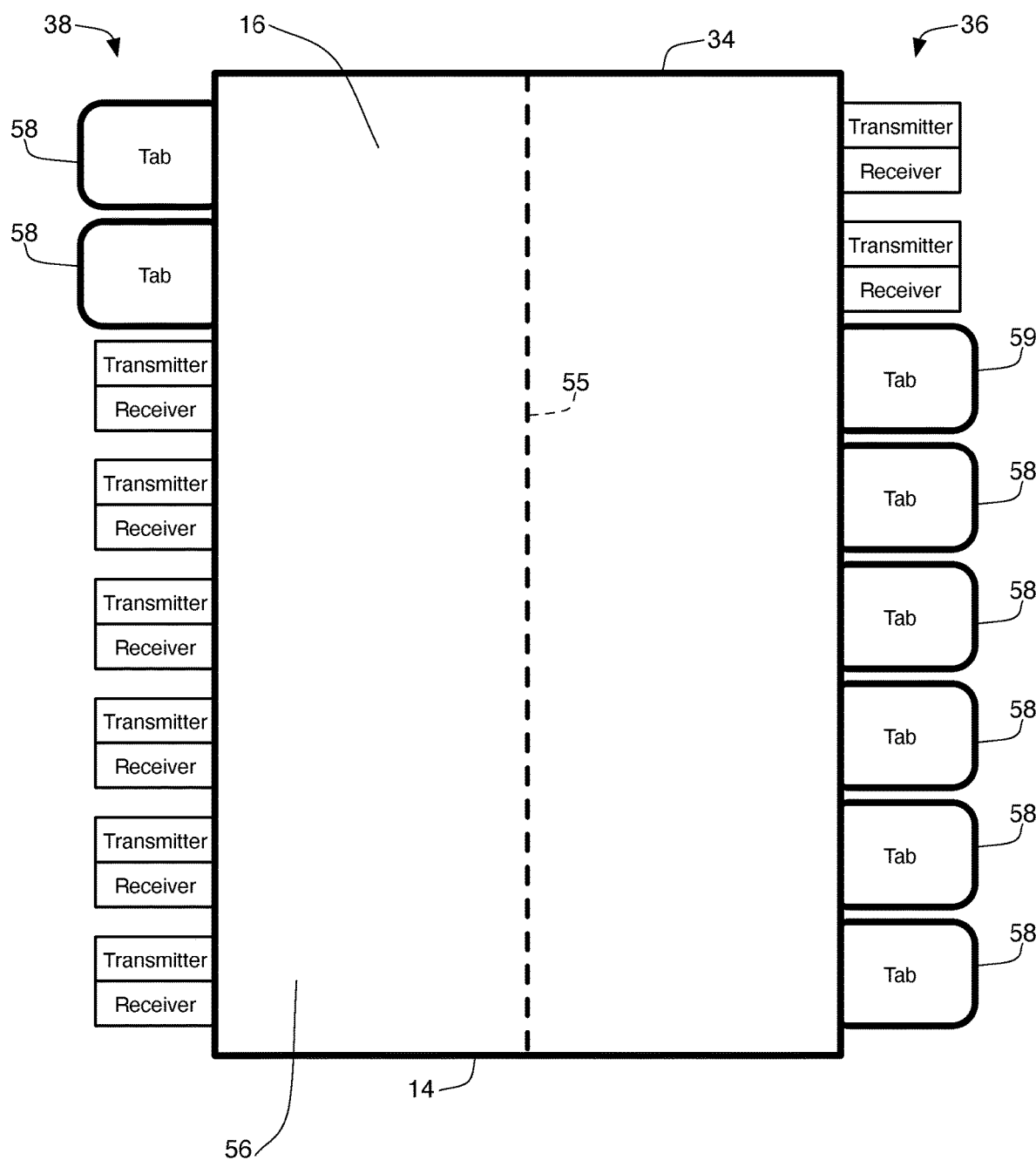
FIG. 5 is a schematic view of the peripheral book reader shown in FIG. 4, with a first page of the book shown in the opened position.

Book 16 includes a number of content pages 56 between the front cover 52 and back cover 54. Both the covers 52 and 54 as well as the content pages 56 are secured together along a central binding 55 and are free to pivot along the binding 55 between right (or closed) position, a middle location, and a left (or open) position in the manner of a conventional book. Each content page 56 page includes a tab 58 which extends from the page. In FIG. 4, eight tabs 58 are shown, each located on the right side of the book 16, which indicates that each page is considered to lay in the right, closed position. In FIG. 5, the top two tabs 58 and their associated physical pages having been moved to the left, open position and therefore overlay two left-side sensors 38. Each tab 58 of each physical page 56 is positioned such that when a page 56 is moved from the closed position shown in FIG. 4, to the open position, such as the top two tabs 58 in FIG. 5, the tab 58 will transition from overlaying a single right side sensor 36 to overlaying a single left side sensor 38 that is in the same lateral position as the single right side sensor 38 that the tab 58 previously overlayed.

Figure 6:
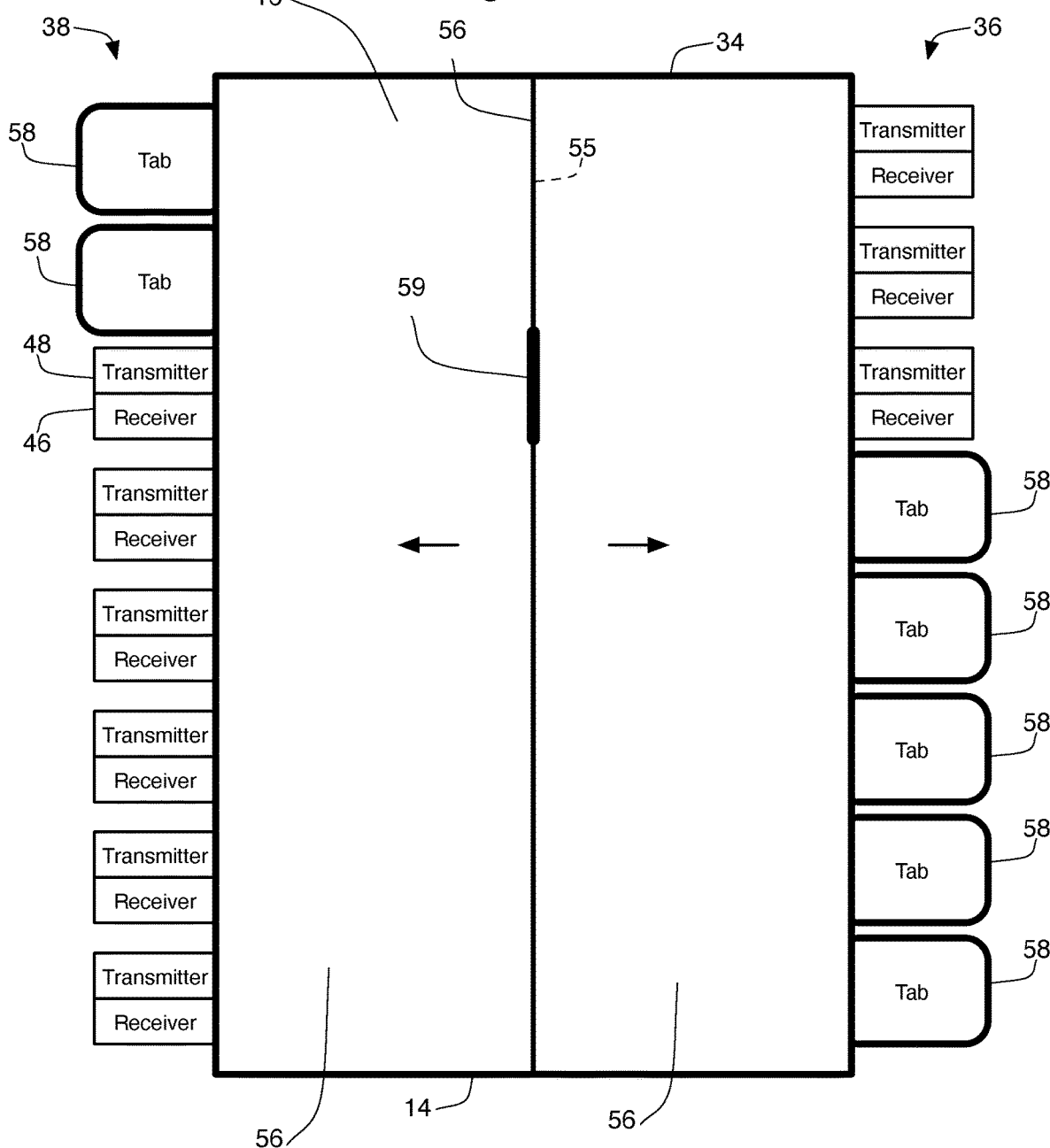
FIG. 6 is a schematic view of the peripheral book reader shown in FIG. 5, wherein the second page of the book is shown in the open position.
Figure 7:
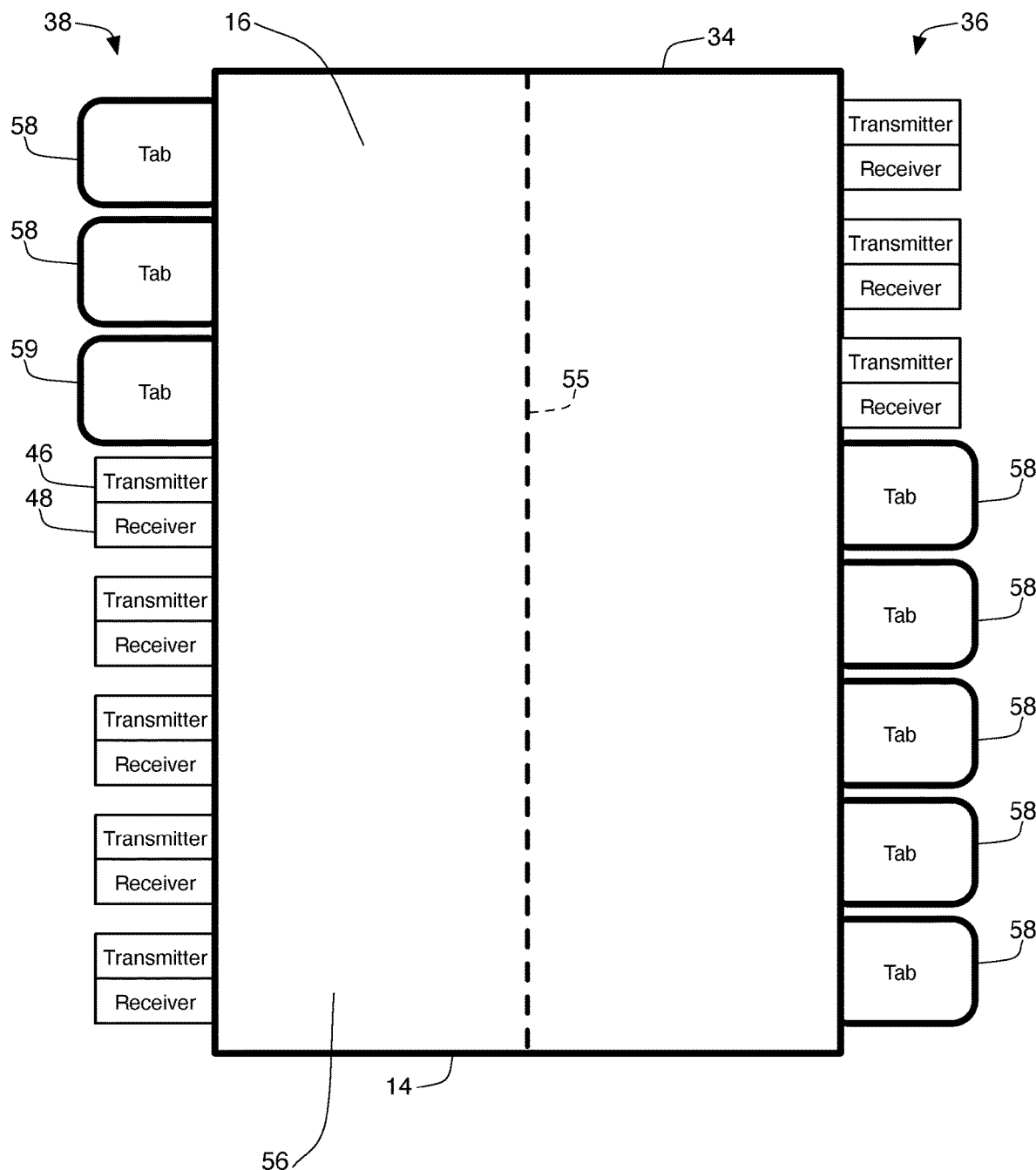
FIG. 7 is a schematic view of the peripheral book reader shown in FIG. 6, with the third page of the book shown in the opened position.

Note that the third tab 59 is shown in the closed position in FIG. 5. In FIG. 6, the third tab 59 and the attached physical page are half-way between the left and right position, thus neither the right side sensor 36 nor the left side sensor 38 will detect the presence of the third tab 59. FIG. 6 therefore represents a transition state between the closed position and the open position. In FIG. 7, the third tab 59 has been placed in the open position, and therefore covers a left-side sensor 38. Note that user that moved the third tab 59 and its associated page 56 from the closed position in FIG. 5 to the middle position shown in FIG. 6 may have returned the third tab 59 to the closed position shown in FIG. 5 without ever fully turning the page.

When a content page 56 is in the right position, the tab 58 of the page is detected by the right side sensor 38 that it overlays. When the right side sensor 38 detects the presence of the tab, the processor 42 recognizes that the page in question is "closed" and that the media content associated with the page is not to be played by the media player 18.

In some embodiments the tabs 58 are opaque and of a white color so as to encourage reflectivity of the light signal transmitted and detected by the sensors. In other embodiments, such as for example where a book 16 has more content pages 56 than the book reader has sensors 36 and 38, the tabs 58 are translucent so as to allow the sensors 36 and 38 to transmit their light signal through multiple tabs 58 and yet still be able to detect the distinct reflected signal corresponding to each tab 58 (and thus allowing the system 10 to be able to identify and play the media content 22 associated with each content page 56).

In one embodiment, when all content pages 56 of a book 16 are in the right (or closed) position, such as is shown in FIG. 4, the system 10 remains in the attract state, whereby a preprogramed video message is displayed in a continuous loop on the screen 28 (example: a video or image regarding a product along with a displayed text message "Open the book for more information!"). In another embodiment, the configuration of FIG. 4 could be considered just another content selection. In at least one embodiment, when the system 10 is in the attract state, there is no sound or audio component to the attract loop video message. Alternatively, the attract loop could include an audio component that the media player 18 sends only to the built-in speaker 32 of the book reader 14 and not the speakers 30 associated with the display 12 so as to minimize background noise in a commercial environment. In other embodiments, the volume is simply reduced during attract loop operation.

When a page 56 of the book 16 is moved from the closed position, the peripheral processor 42 receives a signal from the corresponding right sensor(s) 36 that the tab has been removed. The peripheral processor 42 will then wait to see if the correspondent left sensor(s) 38 detect that the tab has be placed on in the open position. When this occurs, the tab 58 of the page overlays the laterally corresponding left side sensor 38, and the processor 42 instructs the controller 40 to signal the media player 18 that a new page is displayed, thereby triggering the media content 22 associated with the displayed page to be played by the media player 18. This process is repeated with each page 56 of the book 16.

Note that if the peripheral processor 42 receives a signal from a left sensor 38 that a tab 58 has been positioned over the sensor 38, but the peripheral processor 42 did not previously receive a signal that the tab 58 had been removed from the correspondent right sensor 36, the peripheral processor 42 will ignore this signal. In other words, the system 10 requires that it first receive a signal that a tab 58 has been removed from the right sensor 36 before reacting to a signal that the tab 58 has been placed on the left sensor 38, and vice versa. If it did not do so, a user might inadvertently trigger a page change by merely placing their hand on one or more of the left sensors 38. This is described in more detail in connection with the method described in connection with FIG. 11.

When a page 56 that is displayed in the open position is moved back to the closed position the system detects the return of the tab 58 over the right side sensor 36 and returns to displaying the media content 22 of the preceding page that is now back on display. If all the pages 56 of the book 16 are returned back to the closed position, then, after a predetermined amount of time has passed, the system 10 will return to the attract mode. In some embodiments, the system 10 is programed to include a timer function, such that if a content page 56 is left in the open position for a period of time, the system will interrupt the displayed media content associated with the open page and return the system to the attract mode. In still further embodiments, the system 10 will return to the attract mode whenever a content presentation for a selected content page has been completely presented.

Figure 8:
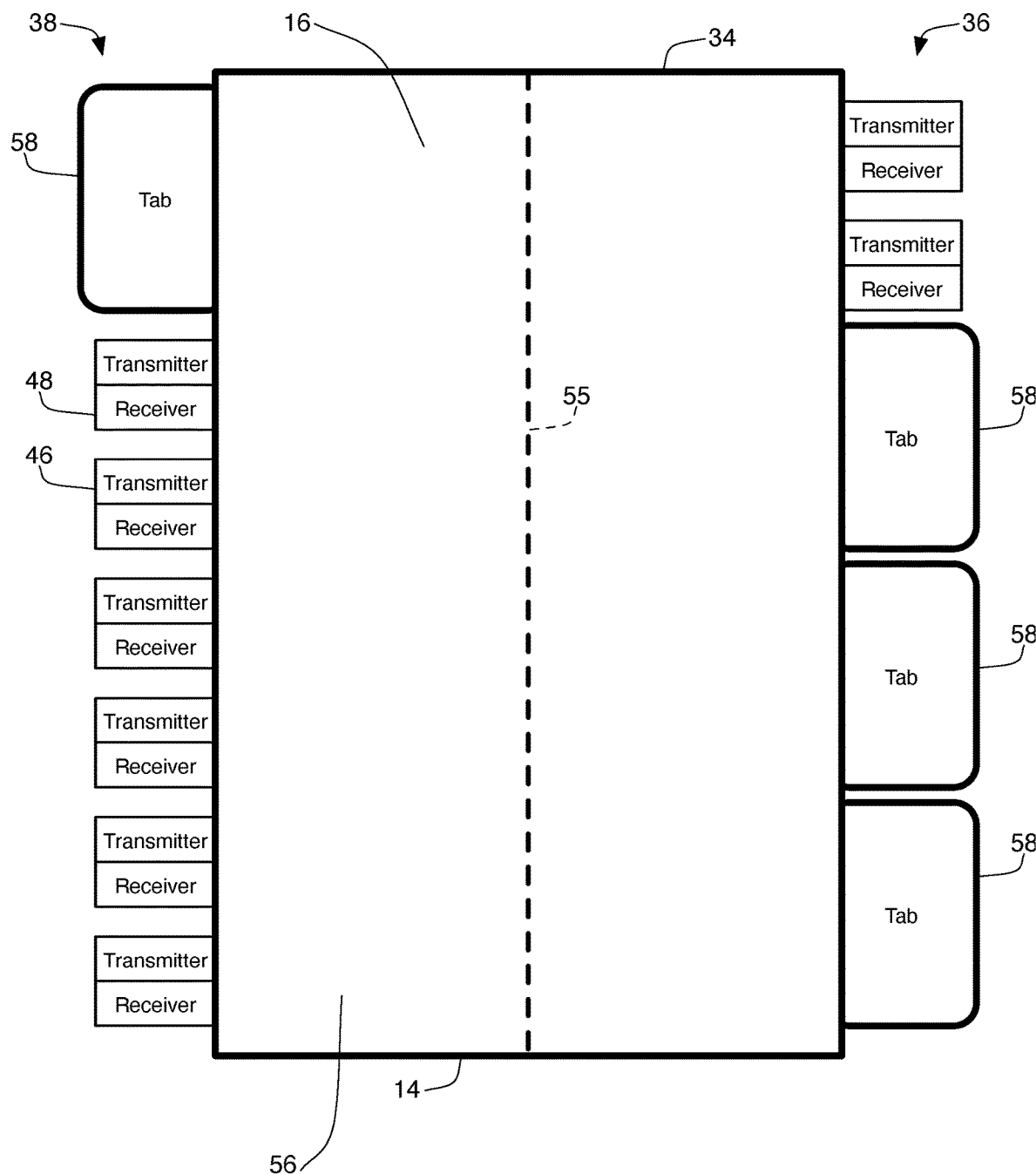
FIG. 8 is a schematic view of the peripheral book reader shown in FIG. 2, with a book having four content pages positioned over the reading surface of the book reader and shown with a first content page in the opened position.

It will be recognized that despite a book reader 14 having a set number of right side sensors 36 and left side sensors 38, books 16 usable with the reader 14 may have a number of pages different than that of the number of sensors. For example, in the embodiment shown in FIGS. 8-10 a book 16 having only four content pages is shown in use with the book reader 14. In this instance, each tab 58 is sized to overlay two sensors respectively of the right side sensors 36 and left side sensors 38. In these embodiments, the sensors 36 and 38 are configured to operate in a pairs. In FIG. 8, there would be four sensor pairs on both the left side and the ride side of the book reader peripheral device 14. It would also be possible to group the six right sensors 36 into triplet sets and the six left sensors 38 into corresponding sets, such that the peripheral 14 is configured to read the position of two tabs 58.

FIG. 9 shows the book 16 with the last page (and therefore the last tab 58) in the left or open position. As explained above, the right cover 54 of the book 16 is secured to the surface of the book reader 14, such as through the use of magnets. To ensure ease of use, embodiments of the book reader 14 include manual controls that are accessible by closing the right cover 54 of the book 16 and revealing the top surface of the book reader 14. In at least one embodiment, shown in FIG. 10, controls are embedded on this surface that include a reset button 60 and a volume control 62. The reset button 60 can be a microswitch of the type accessible through a hole in the surface of the book reader 14, wherein pressing the reset button 60 causes the book reader 14 (and its processor 42) to reset. The volume control 62 may be configured to control the volume of the built-in speaker 32 and/or the display speakers 30. In the embodiment shown, the manual controls are only visible and accessible when the back cover 54 of the book 16 is released and removed from the book reading surface 34.

To reiterate the functionality of the embodiments of the system 10 shown in FIGS. 1-10 and to demonstrate a method 100 of playing media content directed by a book is provided by the system 10, a flow path showing the functional interaction between the media player 18 and book reader 14 is provided in FIG. 11 with reference to the elements shown in FIGS. 1-10.

The system 10 starts method 100 at step 102, where the media player 18 will be displaying the attract loop message 102. In FIG. 11, steps taken by the media player 18 are shown in the left side of the flow chart, while steps taken by the peripheral book reader 14 are shown on the right side of the flow chart. Where the attract loop message played in step 102 includes sound, the sound will be directed at 104 to be played on the built in speaker 32 of the book reader 14.

While the media player 18 is playing the attract loop at step 102, the book reader 14, at step 106, will read the initial position of the tabs 58. The initial position is detected by the sensors 36 and 38 to determine the page configuration of the book 16. The initial position may be with the book 16 having all tabs 58 in the right or close position, but this is not required.

If a page 56 is moved from the initial position, the system 10, at step 108, will detect that the tab 58 has been removed from the sensors 36, 38 on one side of the book display area 34. This is the initial step required before the system 10 will respond to the detection of a tab being placed down on a sensor 36, 38. As explained above, if step 108 does not detect that a tab 58 has been removed from one side, it will not respond to a signal that a tab 58 has been placed down.

At step 110 the system 10 will sense that the tab 58 has been placed on the corresponding sensor on the other side of the book 16. If the peripheral processor 42 determines that the tab 58 has been placed on the corresponding sensor on the other side of the book 16, then at step 112, the processor 42 will instruct the controller 40 to transmit a new page signal to the media player 18. At step 122, the peripheral processor 42 will then reestablish the tab positions of the book 16, and return to step 108.

At the media player 18, at step 114, if the new page signal is received by the media player processor 24, then the processor 24 will identify the media content 22 associated with the new page, retrieve it from the storage 20, and play the new page media at step 116. At step 118, if the system 10 is configured to play the audio component of the selected media on the book reader speaker 32, then the audio component is thusly played. In some embodiments where the display 12 includes speakers 30, the system will be configured to play the audio component through the speakers 30 as an alternative to speaker 32.

If the peripheral processor 42 does not detect that the tab 58 lifted from sensors 36, 38 on one side (detected at step 108) was not placed on the opposite side (as determined by at step 110), then step 120 will determine if the book reader 14 detects that the previously lifted tab 58 is returned to the original side at which it started. If not, the peripheral processor 42 will return to step 110 to await the return of that tab 58 to one side (step 110) or the other (step 120). If the tab 58 is returned to the original side (as determined by step 120), the peripheral processor 42 will then reestablish the tab positions of the book 16 at step 122 and return to step 108.

The many features and advantages of the invention are apparent from the above description. Numerous modifications and variations will readily occur to those skilled in the art. Since such modifications are possible, the invention is not to be limited to the exact construction and operation illustrated and described. Rather, the present invention should be limited only by the following claims.

What is claimed is:

1. A system for selecting and displaying media content comprising:
a display and a book reader, the display and the book reader in electronic communication with each other;
the display comprising: a video display screen and a media player in electronic communication with the video display, the media player comprising a storage drive configured to accept and store media content, a media player processor configured to access the storage drive and to transmit selected media content to the video display screen, and programming to control the media player processor;
the book reader comprising: a book reading surface, a plurality of sensors divided into a plurality of right side sensors and a plurality of left side sensors, a controller, a book reader processor, and book reader programing,
the plurality of right side sensors and the plurality of left side sensors in electronic communication with the controller and the book reader processor, the book reader programing configured to interpret signals received from the plurality of sensors, control the book reader processor, and communicate with the controller, the plurality of right side sensors being uniformly spaced apart along the right side of the book reading surface, each of the plurality of left side sensors being laterally aligned with one of the plurality of right side sensors;
at least one of the plurality of sensors configured to detect the presence and position of a content page of a book when the book is positioned on the book reading surface, each content page of the book having printed media content associated with the media content stored on the storage drive, where the at least one of the plurality of sensors is at least one of the plurality of left side sensors, the controller being configured to signal the media player processor to locate and retrieve the selected media content stored on the storage drive that is associated with the content page and to display the selected media content on the display screen.

2. The system of claim 1, wherein the book comprises a front cover, a back cover and a plurality of content pages positioned therebetween, the front cover the back cover and the plurality of content pages being bound together along a binding, and being movable between a closed position and an open position.

3. The system of claim 2, when the book is positioned on the book reading surface, the back cover being releasably secured to the book reading surface so as to retain the book in a fixed position thereon.

4. The system of claim 3, wherein each of the plurality of content pages is provided with unique printed media content, the unique printed media content of each content page corresponding to the selected media content stored on the storage drive.

5. The system of claim 1, wherein each of the plurality of content pages include a tab extension, each tab extension overlaying at least one of the plurality of right side sensors when in the closed position and overlaying a corresponding number of laterally aligned left side sensors when in the open position.

6. The system of claim 5, wherein the book reader further comprises a built in speaker, at least some of the media content having an audio component, the media player processor configured to access the storage drive and to transmit the selected media content having an audio component to be played over the built in speaker.

7. The system of claim 6, wherein the display further comprises at least one display speaker, the media player processor configured to access the storage drive and to transmit the selected media content having an audio component to be played over at least one speaker selected from the group consisting of: the built in speaker, the at least one display speakers, and any combination thereof.

8. The system of claim 5, wherein the book reader further comprises manual controls, the manual controls are positioned on the book reading surface and are only accessible when the book is removed from the book reading surface.

9. A system for selecting and displaying media content comprising:
- a display and a book reader, the display and the book reader in electronic communication with each other;
    - the display comprising: a video display screen and a media player in electronic communication with the video display, the media player comprising a storage drive configured to accept and store media content, a media player processor configured to access the storage drive and to transmit selected media content to the video display screen, and programming to control the media player processor;
    - the book reader comprising: a book reading surface, a plurality of sensors divided into a plurality of right side sensors and a plurality of left side sensors, a controller, a book reader processor, and book reader programing, the plurality of right side sensors and the plurality of left side sensors in electronic communication with the controller and the book reader processor, the book reader programing configured to interpret signals received from the plurality of sensors, control the book reader processor and communicate with the controller; and
- a book, the book having a front cover, a back cover and a plurality of content pages therebetween, the back cover being temporarily secured over the book reading surface, each of the plurality of content pages being movable between an open position and a closed position, each content page having printed media content associated with the media content stored on the media drive, each of the plurality of content pages having a tab, in the closed position each tab overlaying at least one of the plurality of right side sensors, in the open position each tab overlaying a at least one of the plurality of left side sensors that correspond to a lateral position of the at least one of the plurality of right side sensors,
- at least one of the plurality of sensors detecting the presence and position of one of the content pages, where the at least one of the plurality of sensors is at least one of the plurality of left side sensors, the controller being configured to signal the media player processor to locate and retrieve the selected media content stored on the storage drive that is associated with the content page and to display the media content on the display screen.

* * * * *